United States Patent [19]

Chung

[11] Patent Number: 4,851,234

[45] Date of Patent: Jul. 25, 1989

[54] PROCESS FOR PREPARING AN ANTISTALING AGENT FOR BAKED GOODS

[76] Inventor: Frank H. Y. Chung, 30 Dorset Rd., Norwalk, Conn. 06851

[21] Appl. No.: 185,712

[22] Filed: Apr. 25, 1988

Related U.S. Application Data

[63] Continuation of Ser. No. 869,479, Jun. 2, 1986, abandoned.

[51] Int. Cl.$^4$ .................. A21D 2/00; A21D 8/04; A23L 1/105
[52] U.S. Cl. .................................. 426/7; 426/20; 426/63; 426/549; 426/653; 426/654
[58] Field of Search .......... 426/7, 18, 19, 20, 63, 426/653.4, 549; 425/69

[56] References Cited

U.S. PATENT DOCUMENTS

| | | | |
|---|---|---|---|
| 1,179,877 | 4/1916 | Wahl et al. | |
| 2,657,143 | 10/1983 | Kass | 99/91 |
| 3,015,565 | 1/1962 | Suntheimer | 99/90 |
| 3,031,306 | 4/1962 | Freed | 99/90 |
| 3,425,840 | 2/1969 | Hunter et al. | 99/91 |
| 3,556,804 | 1/1971 | Cohn et al. | 99/90 |
| 3,934,040 | 1/1976 | Smerak et al. | 426/20 |
| 4,299,848 | 11/1981 | DeStefanis et al. | 426/20 |
| 4,320,151 | 3/1982 | Cole | 426/18 |
| 4,500,548 | 2/1985 | Silva | 426/19 |

FOREIGN PATENT DOCUMENTS

0138352  10/1980  Japan .................................. 426/20

OTHER PUBLICATIONS

Chem. Abst. 52,20769d—1958.
Chem. Abst. 98,177861f—1983.
Chem. Abst. 101,150206g—1984.
Chem. Abst. 44,766f—1950.
Chem. Abst. 45,4844i—1951.
Chem. Abst. 63,2311e—1965.
Chem. Abst. 93,130882v–1980.
Chem. Abst. 95,5342j—1981.
Cooper et al., Yeast Fermentation Effects of Temp., pH, ETOH, Sugars, Salt & Osmotic Pressure, Bakers Digest, Dec. 1968, pp. 22, 24, 26, 28, 29 & 63.
Ponte et al., The Bread Improving Effect of Aeptane & Hexane, Cereal Chemistry, 40, 1963, pp. 285–287.
Chem. Abst. 97,22386k—1982.
Kirk–Othmer, Ency. of Chem. Tech., 3rd Ed., vol. 3, p. 442.

*Primary Examiner*—Marianne Cintins
*Attorney, Agent, or Firm*—William E. Dickheiser

[57] ABSTRACT

An improved antistaling agent for baked goods such as bread can be prepared by steeping a bacterial protease in an aqueous alcohol, i.e. ethanol, solution containing flour for a period of time sufficient to prepare the antistaling agent. The alcohol is then separated without removing the alcohol soluble products obtained during the treatment such as by evaporation under vacuum. The wet product can be dried to obtain a powdered antistaling agent.

11 Claims, No Drawings

PROCESS FOR PREPARING AN ANTISTALING AGENT FOR BAKED GOODS

This application is a continuation of application Ser. No. 869,479, filed June 2, 1986, now abandoned.

FIELD OF THE INVENTION

The present invention relates to antistaling agents for baked goods, such as bread, to processes for preparing the same and to processes for preparing baked goods characterized by improved resistance to staling.

BACKGROUND OF THE INVENTION

The problem of bread staling is of great economic importance to the consumer as well as to the baking industry. Since a major criteria in the selection of bread and other similar products is based on soft texture, losses due to customer rejection of breads, rolls, yeast-raised and cake doughnuts due to staling or perceived staling are extensive.

The staling of bread is perceived by a firming of the crumb and loss of pleasant aroma of freshly baked breads. Staling begins immediately after baking and continues as the bread ages. Staling is the result of retrogradation of cooked starch and visco-elastic changes in gluten after baking. Staling bread becomes firmer in texture even though the water content of packaged stale bread does not vary significantly from fresh bread.

In the United States, unsold breads are removed from the supermarket shelves a few days after delivery. These breads will stay on thrift shop shelves for a few additional days. Unsold breads are then disposed to hog farms or feed lots. A one day increase in shelf life of bread could result in large potential savings for the baker and the consumer.

Some of the measures now in commercial use to deal with the bread staling problem include the use of fungal enzymes and glycerol monoesters of long chain fatty acids such as glycerol monostearate. Fungal enzymes (proteases and amylases) are relatively inefficient antistaling agents because these enzymes have relatively low inactivation temperatures (below about 65° C.). Most of the enzyme activity is lost in the early stages of baking. Glycerol monostearate, when added to dough, results in softer bread. However, the bread continues to stale at the same rate after baking. The increased initial softness gives the impression of antistaling.

Amylolytic enzyme additives are presently used in bakery goods to supplement amylolytic enzyme deficiencies in flour to increase gas production. Proteolytic enzymes are added to reduce mixing requirements. Enzyme additives are also used to obtain a whiter, softer and less staling crumb. Both amylases and proteases from fungal sources are used for bread and roll production. These fungal enzymes are active during fermentation and at early stages of baking. However, these fungal enzymes are inactivated at about 65° C. during baking. The bacterial amylase from *B. subtilis* is used to slow down firming of bread. However, the enzyme is heat stable and partially survives the baking process. The continued activity of the enzyme produces gumminess in the bread.

U.S. Pat. No. 4,299,848 describes a method whose end result is to inhibit bread firming and improve keeping qualities of bread and other bakery products. The method is based on treating a natural enzyme which is a mixture of a protease and amnylase enzymes to inactivate the protease. Various inactivation procedures are described to accomplish this end result. Fungal enzymes for baking can be stabilized against thermal denaturation by mixing the enzyme in a concentrated aqueous solution of mono- and disaccharides (U.S. Pat. No. 4,320,151).

Bacterial protease has a higher inactivation temperature (from about 82° C. to about 88° C.). Thus, when added to the dough, some bacterial protease enzymes survive the baking temperature and continue to act on the bread crumb after baking. Continued enzyme activity often produces undesirable gumminess in the crumb when eaten.

Ethanol is a by-product of fermentation in yeast-raised bakery products. During fermentation, the dough increases in softness, elasticity and extensibility as a result of the combined actions of water, enzymes, ethanol, organic acids and other ingredients in the recipe. As much as 2% ethanol is produced in a standard four hour fermentation. Excessive quantities of alcohol retard gas production and produce less desirable bread.

SUMMARY OF THE INVENTION

An improved antistaling agent for baked goods such as bread can be prepared by steeping a bacterial protease in a solution of water-miscible organic solvent for fat and water, preferably in the presence of a dispersing agent such as flour, for a period of time and at a temperature sufficient to prepare the antistaling agent. The organic solvent can then be separated preferably without removing the solvent soluble products obtained during the treatment such as by evaporation under vacuum. The wet product can be dried to obtain a powdered antistaling agent.

The addition of this solvent treated bacterial enzyme product to bread dough significantly reduces the rate of staling. Bread baked with the powdered antistaling agent was softer than bread baked with a commercially available bread softener after seven days of storage. The bread gumminess normally associated with the use of bacterial protease in bread is eliminated by the invention.

DETAILED DESCRIPTION OF THE INVENTION

The bacterial protease is steeped in a food grade fat solvent such as an alcohol or mixtures of alcohols. Other solvents such as hexane, heptane and petroleum ether can also be used. If the final product is to be used in food, the solvent or alcohol is preferably food grade, i.e. ethanol. Other alcohols such as methanol and propanol can be used if the product is not to be used as a food or if the solvent or alcohol is removed in the drying process sufficient to provide a food grade product. Ethanol, such as grain alcohol, is preferred because of its ready availability and food grade status. Hexane is also an accepted solvent for food processing. The invention will be discussed in connection with ethanol though the discussion is applicable to all solvents and alcohols as can be easily understood by one of ordinary skill in the art.

The enzymes used in the invention can be any bacterial protease enzyme. As the final use is preferably in food, the enzyme should not be such as to affect the food status of the final product, i.e., a food grade enzyme. Bacteria such as *Bacillus subtilis* are preferred sources though enzymes from other sources such as *Aspergillus oryzae* and *Rhizopus chinensis* can be used. As used herein the term "protease" which designates the main function of the enzyme is intended to reflect the nature of natural enzyme products which are not pure and can contain contain various enzymes including amylases and lipases. Commercial enzyme compositions are generally impure and contain a filler agent to provide an economical and conveniently usable product.

While the enzyme can be alcohol treated alone, it is preferred that the enzyme be dispersed with a dispersing agent during alcohol treatment. The dispersing agent can be any solid which is compatible with the end use of the antistaling agent. Flour such as wheat flour is preferred for breads containing flour. Potato flour, other grain flour, soy flour and the like can be used. It is not critical as to the source of the flour or the treatment given the flour as long as the flour does not interact negatively with the enzyme or adversely affect the preparation of the baked goods. Other solid dispersing agents which can be used include starch, dairy protein, dried whey, whey protein fractions, sugars, cellulose derivatives and the like. This dispersant is in addition to the filtering agents normally used in preparing commercial enzyme compositions. Preferably, the dispersing agent is flour which can be partially hydrolyzed with the enzymes during steeping. The dispersant is used in an amount ranging from about 10% to about 50% based on the total weight of the dispersant, solvent and water.

The solvent or alcohol as well as the times, temperatures and other physical conditions, are used in amounts and at levels sufficient to prepare the antistaling agent but insufficient to inactivate a substantial part (less than 10%) of the enzyme. The alcohol can be used in an aqueous solution for treating the enzyme and the dispersant. The amount of water is sufficient to provide covering liquid for the steeping without an excess use of the solvent. The amount of water can range from about 50% to about 98%, preferably to about 95% and correspondingly from about 2%, preferably from about 5% to about 50% alcohol based on the total weight of the water and solvent. In a preferred embodiment where the dispersant, preferably flour, is steeped first and then enzyme is added and the mixture further steeped, the aqueous solvent mixture preferably contains from about 0.5% to about 25% alcohol based on the total weight of the flour, water and alcohol.

The enzyme is treated for a time and at a temperature sufficient to form the antistaling agent. When treating an enzyme with or without dispersing agent, times ranging from about 30 minutes to about 2 hours can be used. The temperature can range from about 30° C., preferably 35° C. up to the inactivation temperature of the enzyme, e.g., about 55° C. and is inverse to the time. The amount of time used is dependent on the enzyme and solvent concentration. The greater the concentration of alcohol, the shorter the time that need be used. Conversely, the use of small quantities of alcohol may require greater time to effect the same degree of antistaling effect.

In a preferred embodiment, flour of the type normally used for bread is steeped in an aqueous alcohol (ethanol) solution for about 30 minutes to about 1 hour at a temperature ranging from about 25° C. to about 55° C. The steeping is done under mild agitation. The enzyme can be a food grade proteolytic enzyme derived from *Bacillus subtilis* standardized for consistent activity with a maltodextrin and sold under the trademark HT-Proteolytic-200 by Miles Laboratories. The proteolytic enzyme HT-Proteolytic-200 has an activity within the range of from about 190 to about 210 Neutral Protease Units (NPU) and can be added at an amountof from about 0.0005% to about 0.01% by weight based on the dry weight of said enzymes and said flour (dispersant). A neutral protease unit is that amount of enzyme which will liberate one (1) micromole of tyrosine per minute using the assay procedures set forth in the Food Chemicals Codex for Protease activity, bacterial (P.C.) assay where F.C.C. PC units per gram equal NPU per g $\times$ 120.8. After steeping for an additional period of time ranging from about 30 minutes to about 2 hours at a temperature ranging from about 35° C. to about 55° C., the mixture is dried without separating any materials soluble in the aqueous alcohol solution. Evaporation followed by freeze drying is preferably used.

The antistaling agent of the invention can be used as is in a liquid state, dried or blended with other ingredients (before or after drying). However, since large quantities of alcohol (over about 2%) adversely affect the growth capabilities of the yeast leavening, the amount of alcohol is reduced as low as possible. Also, a dry product is more conveniently handled by bakers. The liquid can be extracted from the reaction mass using procedures which use temperatures below the inactivation temperature of the enzymes, i.e. below about 55° C. When dispersing agents are present, the solvent is removed without removal of solvent soluble fractions. Thus, the alcohol can be removed by evaporation and the wet cake dried by freeze drying. Drying aids and fillers can be added if necessary.

The antistaling agent prepared without a dispersant can be used in the liquid state after removal of the solvent or in the dry state. Because of the small amount of enzyme present, a drying aid must be added to assist in drying. The drying aids can include the materials listed herein as dispersants or any other material performing that function which provides a food grade product and does not inactivate the enzyme.

The antistaling agents of the invention can be used in antistaling effective amounts. Amounts can vary depending on the nature of the bakery products and other ingredients present. The amount can also vary depending on the concentration of the enzyme and/or the enzyme/dispersant ratio. The products of the invention are used in amounts sufficient to provide from about 0.00005% to about 0.1% enzyme on a flour basis in the bread. Relative to a product having from about 0.0005% to about 0.01% enzyme based on the dry weight of the enzyme and dispersant, an amount for use in bread ranges from about 0.1% to about 10%, preferably from about 0.5% to about 5% by weight on a flour basis in the bread. Actual amounts can be easily determined by one of ordinary skill in the art.

The yeast-raised bakery products of the invention include bread as well as sweet doughs. The bakery products can be prepared by conventional methods such as the straight dough or by the sponge and dough methods. Bakery products which are included within the invention can be illustrated by American white, rye, bran, Pullman-type (square) loaf bread, English-type, roll bread, milk bread, French bread, butter rolls, pumpernickel, sweet doughs such as pastries or yeast-raised doughnuts, jam or cream filled buns, and the like. The breads can be in the form of loaves, rolls, hamburger or hot dog rolls, club rolls, pizza crust or any other yeast-raised bakery product.

The ingredients of these products are well known to one of ordinary skill in the art. The antistaling agent can be added dry or in a slurry. If added dry, the antistaling agent can be added with the dry ingredients of the straight dough or with the sponge and/or dough but preferably in the sponge when using the spong and dough fermentation method. When the antistaling agent is added as a slurry (generally with enough water to make a slurry), the slurry is preferably added to the dry ingredients at the same time as the water is added.

The bakery products can also include a fermentation time reducer such as described in U.S. Pat. No. 4,500,548 which is prepared by fermenting a slurry of flour, optionally sugar and water (120 to 250 parts/100 parts flour) with baker's yeast for an extended period of time, i.e. over 12 hours. The fermented mixture with a pH of below 4.75 is dried to a moisture content of from about 4.5% to about 9% under conditions which will not drive off a major amount of the volatile flavor and aroma components. The fermentation time reducer can be used in an amount sufficient to provide the desired reduction in fermentation time. The amount can range from about 2% to about 10% (add on) based on the weight of the flour. This product is available from Stauffer Chemical Company under the trademark FERMENTATION AID.

The functionalized dairy product can be used in bread and bakery goods with standard ingredients other than flour and water such as yeast; yeast food; oxidants such as bromates, iodates or ascorbic acid; reducing agents such as sodium bisulfite; enzymes such as proteolytic and amylolytic enzymes; surfactants and dough conditions such as sodium and calcium stearoyl 2-lactylate; mono/diglycerides, ethoxylated mono/diglycerides and lecithin; flavors; colors; anti-mycotics such as sodium and/or calcium propionate; dough conditioners; dairy solids; sweeteners, i.e. sucrose, dextrose, corn syrup and milk replacers.

The antistaling agent can be blended with any or all of these ingrdients at the time of bread making or to formulate a bread base product for sale to the consumer.

The present invention will be more fully illustrated in the Examples which follow.

EXAMPLE 1

PREPARING ANTISTALING AGENT

Three liters of water and 0.15 liters of food grade ethanol, i.e., a 5% ethanol solution, were combined in a large container and placed in a water bath which was maintained at 36°-40° C. One kilogram of wheat bread flour was slurried in the ethanol-water solution and stirred for 1 hour. The pH of the slurry was maintained at about 7.0-7.2. After 1 hour, 0.5 grams of bacterial enzyme derived from *Bacillus subtilis* (Miles Laboratories HT-200 standardized to 200 neutral protease units of enzyme activity) dissolved in 30 milliliters of water were well admixed into the slurry. After heating and stirring for 1 hour, the ethanol was evaporated in a vacuum oven at 40° C. The resulting wet material was freeze dried to obtain a white, powdery product.

EXAMPLES 2-8

Various antistaling agents were prepared using the procedure of Example 1 with variations in the alcohol concentration. Examples 7 and 8 are controls. The formulations used are set forth in Table 1 as follows:

TABLE I

| Example No. | 2 | 3 | 4 | 5 | 6 | 7 | 8 |
|---|---|---|---|---|---|---|---|
| Ingredients | | | | | | | |
| Wheat Flour (Kg) | 1 | 1 | 1 | 1 | 1 | 1 | 1 |
| Enzyme (g) | 0.5 | 0.5 | 0.5 | 0.5 | 0.5 | — | 0.5 |
| Water (L) | 3 | 2.9 | 2.7 | 2.1 | 1.5 | 2.9 | 3 |
| Ethanol (L) | 0.06 | 0.15 | 0.45 | 0.9 | 1.5 | 0.15 | — |
| Ethanol Conc. (% by volume) | 2% | 4.9% | 14.3% | 30% | 50% | 4.9% | 0 |

The products of Examples 2-8 as well as the control using a commercial fungal enzyme bread softener were evaluated in conventional white bread prepared by the straight dough method using the following formulation (the amounts given are in grams):

| Ingredients | Grams |
|---|---|
| Bread Flour | 700.00 |
| Water | Variable |
| Fresh Yeast | 17.50 |
| Shortening | 21.00 |
| Sugar | 56.00 |
| Salt | 15.75 |
| Non-fat Dried Milk | 21.00 |
| Yeast Food | 3.50 |
| Antistaling Agent - Examples 2-8 | 2-21 (variable) |
| Commercial Bread Softener | (3.00 - Control) |

All the dry ingredients, including the antistaling product of Examples 2-6 or control Examples 7-9, were dry blended. The yeast was then dry blended with the previously blended dry ingredients. The water at 26.7° C. was added and the mixture was blended in a jacketed bowl (McDuffy Bowl) with a water bath temperature of 23° C. attached to a Hobart TM planetary mixer for 1 minute at slow speed. After adding the shortening mixing was continued for 15 minutes at medium speed. The final dough temperature was 26.7° C.

The dough was held in a fermentation cabinet at 26.7° C. for 3 hours and 30 minutes. 540 grams of the dough was scaled out and held for 10 minutes for intermediate proof. The dough was rolled, molded, placed in a pan and proofed to 1 inch above the edge of the pan in a final proof box (50-55 minutes) at 43° C. and 80% relative humidity. The bread was baked at 218° C. for 22 minutes.

The products of Examples 2-8 and the control were evaluated in the straight white bread using 0.8% on a flour basis of the dry antistaling agent prepared with various levels of alcohol (Examples 2-6).

The products of Examples 2-6 were steeped in 2%, 4.9%, 14.3%, 30% and 50% alcohol solutions respectively. Example 7 was prepared using 4.9% alcohol solution and no enzyme. Example 8 was prepared with flour and enzymes steeped in water (no alcohol). The control utilized a commercial fungal enzyme bread softener.

The staling or firmness of the bread was evaluated with a compressimeter using AACC method 74-10, the units being reported in grams of actual force needed to depress the center of a slice of bread 2.5 millimeters. The smaller the number the softer the bread.

The following results were obtained:

TABLE II

| Example | Dough Condition | Specific Volume (Bread) | Bread Firmness (grams) | | |
|---|---|---|---|---|---|
| | | | 1 Day | 4 Days | 7 Days |
| 2 | Soft, Resilient | 5.2 | 16.25 | 27.25 | 39.75 |
| 3 | Soft, Resilient | 5.2 | 15.25 | 26.25 | 35.75 |
| 4 | Soft, Resilient | 5.5 | 15.25 | 26.5 | 34.75 |
| 5 | Sl. Bucky, Resilient | 5.3 | 16.25 | 29.5 | 38.25 |
| 6 | Bucky, Firm | 5.2 | 17 | 30 | 41 |
| 7 | Bucky, Firm | 5.1 | 16.25 | 28.75 | 41.25 |
| 8 | Soft, Resilient Sl. Sticky | 5.3 | 15 | 26.75 | 32.75 |
| Control | Soft, Resilient | 5.2 | 17 | 32.5 | 42.75 |

As can be seen from these data, the products of the invention (Examples 2-6) provide good dough and good bread specific volume as well as lower firmness (less staling) after 7 days, particularly when using 2%, 4.9% or 14.3% ethanol concentration (Examples 2, 3 and 4). Higher ethanol concentrations tended to adversely affect the dough (Examples 5 and 6). The use of fungal enzyme (control) gave a good dough but bread staling was more prevalent. The use of alcohol treated flour without a bacterial enzyme (Example 7) gave bucky, firm, non-resilient dough. The use of enzymes steeped in water (Example 8) gave soft, sticky dough which produced gummy bread as evidenced by the lack of firmness. By "bucky" is it intended to mean a decrease in dough resilience and stretchability.

EXAMPLES 9-17

Baked goods were prepared in accordance with Example 2 using products from Examples 2 and 7. Based on 700 grams of flour, a 2 gram sample of the antistaling agent is equivalent to 0.00014% enzyme, 7 grams (1%) equivalent to 0.0005%, 14 grams (2%) equivalent to 0.001% and 21 grams (3%) equivalent to 0.0015%. Firmness of the bread was determined by the AACC method 74-10 as outlined above. The following results were obtained:

TABLE III

| Ex. No. | Enzyme Conc. % | Ethanol Steeping | Crumb Firmness Day | | | Dough | | | | Crumb | | | |
|---|---|---|---|---|---|---|---|---|---|---|---|---|---|
| | | | 1 | 2 | 3 | A | B | C | D | E | F | G | H |
| 9 | 0.00014 | Yes | 15.75 | 20 | 24 | X | | | X | X | | | |
| 10 | 0.0005 | Yes | 13.25 | 15.75 | 21.25 | X | | | X | X | | | |
| 11 | 0.0010 | Yes | 13.25 | 14 | 16.25 | X | | | X | X | | | |
| 12 | 0.0015 | Yes | 12.75 | 13.75 | 15.75 | X | | | | | X | | |
| 13 | 0.0005 | No | 15.25 | 17.75 | 21.75 | X | | | | | X | | |
| 14 | 0.0010 | No | 14 | 15.25 | 17.75 | X | X | | | | | X | |
| 15 | 0.0015 | No | 13.25 | 15 | 16.75 | | X | X | | X | | | X |
| 16 | * | No | 15.75 | 24 | 36 | X | | | | X | | | |
| 17 | ** | No | 15.5 | 21.5 | 30.5 | X | | | X | X | | | |

A-Soft Extensible
B-Slightly Sticky
C-Soft
D-Pick-up Easily
E-Not Gummy
F-Slightly Gummy
G-Moderately Gummy
H-Gummy
*Commercial bread softener of the monoglyceride type.
**Commercial enzyme type softener (MLO-PANIPLUS)

As can be seen from the data in Table III, the products of Examples 10-12 were not gummy and Example 13 was slightly gummy while providing excellent softness after 7 days. The only other non-gummy samples (Examples 17 and 18) staled after 3 days. The only other slightly gummy sample (Example 14) staled more rapidly than the sample of Example 13 (the one day crumb firmness of Example 14 was approximately equal to the 7 day crumb firmness of the sample prepared in accordance with the invention in Example 13).

What is claimed is:

1. A process for preparing antistaling agents for baked goods comprising heat treating bacterial protease enzyme with an alcohol, said alcohol being used in an amount sufficient to prepare the antistaling agent but insufficient to inactivate a substantial portion of the enzyme for a period of time and at a temperature sufficient to produce an antistaling agent and reduce gumminess caused by the enzyme on the baked goods, and separating the alcohol without removing materials which are alcohol soluble.

2. The process as recited in claim 1 wherein said protease enzyme is derived from *Bacillus subtilis*.

3. The process as recited in claim 1 wherein said alcohol is ethanol.

4. The process as recited in claim 1 wherein said enzymes are used in an amount ranging from about 0.0005% to about 0.01% based on the dry weight of said enzyme and said flour.

5. The process as recited in claim 1 which further includes a dispersant for said enzymes.

6. The process as recited in claim 5 wherein said dispersant is flour.

7. A process for preparing antistaling agents for baked goods comprising steeping bacterial protease enzyme and flour in an aqueous alcohol solution, said alcohol being used in an amount sufficient to prepare the antistaling agent but insufficient to inactivate a substantial part of the enzyme, for a period of time and at a temperature sufficient to provide an antistaling agent.

8. The process recited in claim 7 wherein the alcohol is ethanol.

9. The process as recited in claim 7 wherein the enzyme is derived from *Bacillus subtilis*.

10. The process as recited in claim 7 wherein said enzyme is used in an amount ranging from about 0.0005% to about 0.01% based on the dry weight of said enzyme and said flour.

11. The process as recited in claim 7 wherein said alcohol is used in an amount ranging from about 2% to about 50% based on the combined weight of the water and alcohol and said alcohol is used in an amount ranging from about 0.5% to about 25% based on the total weight of said flour, water and alcohol.

* * * * *